US008677969B2

(12) United States Patent
Solfrank et al.

(10) Patent No.: US 8,677,969 B2
(45) Date of Patent: Mar. 25, 2014

(54) MASS BALANCING DEVICE FOR AN INTERNAL COMBUSTION ENGINE

(75) Inventors: Peter Solfrank, Frensdorf (DE); Michael Bogner, Eckental (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/580,219

(22) PCT Filed: Feb. 1, 2011

(86) PCT No.: PCT/EP2011/051385
§ 371 (c)(1),
(2), (4) Date: Aug. 21, 2012

(87) PCT Pub. No.: WO2011/104069
PCT Pub. Date: Sep. 1, 2011

(65) Prior Publication Data
US 2012/0312118 A1    Dec. 13, 2012

(30) Foreign Application Priority Data

Feb. 26, 2010   (DE) .......................... 10 2010 009 397

(51) Int. Cl.
*F02B 75/06* (2006.01)
(52) U.S. Cl.
USPC .................................. 123/192.2; 123/192.1
(58) Field of Classification Search
USPC .............................. 123/192.1, 192.2; 74/572.2
See application file for complete search history.

(56) References Cited

U.S. PATENT DOCUMENTS

| 3,769,946 | A | * | 11/1973 | Scherrer | ........................ 418/36 |
| 6,732,694 | B2 | * | 5/2004 | Holweg | .................. 123/179.25 |
| 2009/0297085 | A1 | * | 12/2009 | Solfrank et al. | ............. 384/571 |
| 2009/0308344 | A1 | * | 12/2009 | Ihlemann et al. | .......... 123/192.2 |

FOREIGN PATENT DOCUMENTS

| DE | 102004033927 | 0/2006 |
| JP | 58225242 | 12/1983 |
| JP | 58225243 | 12/1983 |
| JP | 60109636 | 6/1985 |
| JP | 60109639 | 6/1985 |

* cited by examiner

*Primary Examiner* — Lindsay Low
*Assistant Examiner* — Omar Morales
(74) *Attorney, Agent, or Firm* — Volpe and Koenig, P.C.

(57) ABSTRACT

A mass balancing device for balancing free inertial forces and/or free moments of inertia of a reciprocating internal combustion engine (1). The mass balancing device includes two balancer shafts (3, 4) rotating at the same rotational speed in opposite directions of rotation, and a transmission (5) arranged between the crankshaft (2) of the internal combustion engine and the balancer shafts. The transmission drives the balancer shafts at a transmission ratio of crankshaft rotational speed to the balancer shaft rotational speed that is non-uniform over the crankshaft angle such that the angular speed of the balancer shafts is at the maximum at the piston dead centers. The mass balancing device is intended to be configured for an internal combustion engine of multi-cylinder design and the mean value of the transmission ratio is intended to be 1:2.

6 Claims, 1 Drawing Sheet

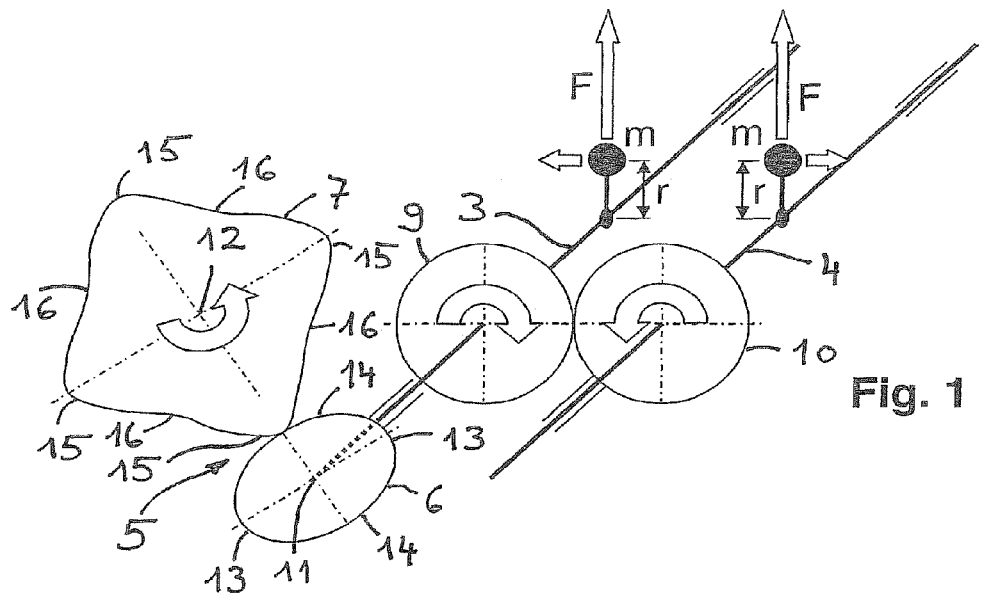
Fig. 1
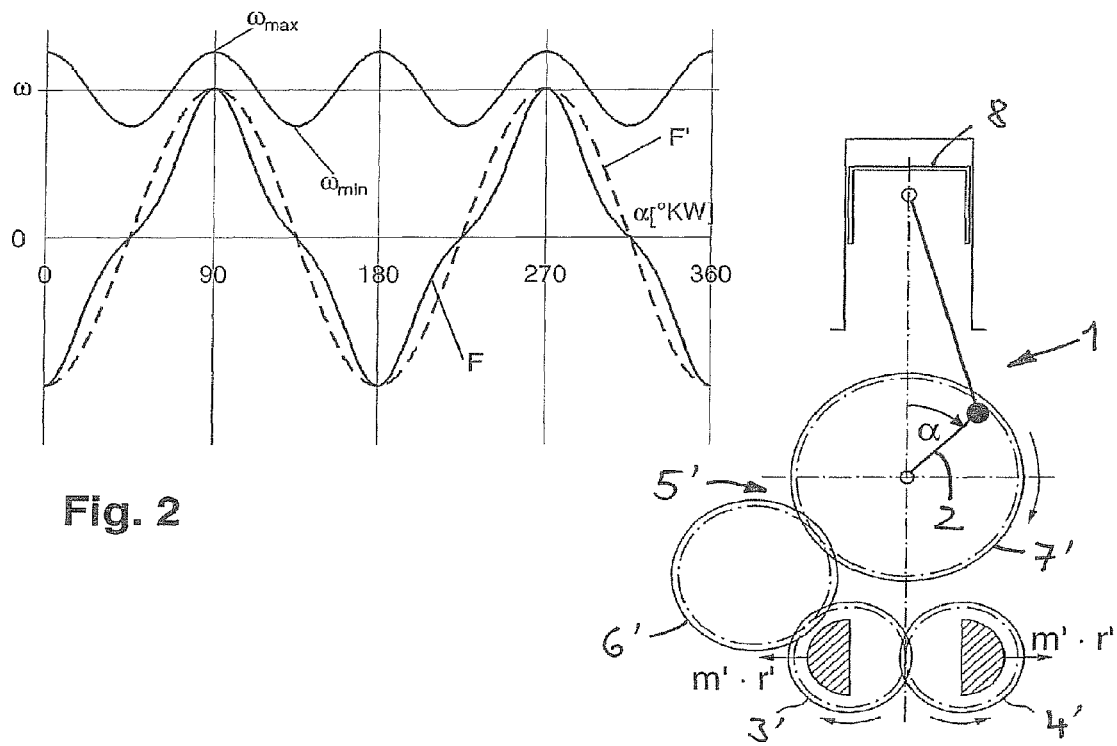
Fig. 2
Fig. 3
(Prior Art)

MASS BALANCING DEVICE FOR AN INTERNAL COMBUSTION ENGINE

FIELD OF THE INVENTION

The invention relates to a mass-balancing device for balancing free inertial forces and/or free moments of inertia of a reciprocating piston internal combustion engine. The mass-balancing device comprises two balancer shafts that rotate at the same rotational speed in opposite directions of rotation and that have unbalanced masses that have force components that boost each other in the direction of the piston stroke and that cancel out in the direction orthogonal to the piston stroke. This mass-balancing device also has a transmission that is arranged between the crankshaft of the internal combustion engine and the balancer shafts. The transmission drives the balancer shafts at a transmission ratio of the crankshaft rotational speed to the balancer shaft rotational speed. This transmission ratio is non-uniform over the crankshaft angle such that the angular speed of the balancer shafts is at a maximum at the piston dead centers.

BACKGROUND

A mass-balancing device of the type named above is already known from JP 60109639 A and JP 60109636 A. The transmissions disclosed there have two intermeshing spur gears that are provided with elliptical and identical rolling circles for generating the non-uniform transmission ratio and that rotate about eccentric axes each with respect to the center point of the ellipse.

In JP 58225242 A and JP 58225243 A, mass-balancing devices for single-cylinder internal combustion engines are disclosed that have transmissions that also have two identical, intermeshing, elliptical spur gears. The mass-balancing devices are each configured, however, so that the angular speed of the balancer shafts is at a maximum at the piston top dead center and is at a minimum at the piston bottom dead center.

DE 10 2004 033 927 A1 discloses a mass-balancing device with a transmission constructed as a chain drive or toothed-belt drive. There it is proposed for the driving wheel of the crankshaft and/or the driving wheels of the balancer shafts to have a non-round construction, in order to impart, on the drive, a non-uniform characteristic that compensates for the rotational fluctuations of the crankshaft.

SUMMARY

The present invention is based on the objective of adapting a mass-balancing device of the type named above with respect to the widest possible range of internal combustion engine applications and simultaneously a high potential for lightweight construction.

This objective is met in that the mass-balancing device is configured for an internal combustion engine only with a multi-cylinder construction and the average value of the transmission ratio is 1:2. Consequently, the balancer shafts rotate at twice the crankshaft rotational speed. In other words, a mass-balancing device is provided for balancing the free inertial forces and/or moments of inertia of second order of an internal combustion engine of the most common in-line and V-type engines. The lightweight construction potential of the mass-balancing device is given in that the non-uniform angular speed of the balancer shafts is at a maximum at the piston dead centers (and also every 90° crankshaft angle in-between) with respect to the average angular speed and accordingly the balancer-shaft mass generating the unbalanced mass can be reduced.

Independent of the structural shape of the transmission, the non-uniform characteristic of the transmission should be based on non-round gear wheels with non-uniform shapes that must be synchronized with the rotational position of the unbalanced mass, so that the angular speed of the balancer shafts is at a maximum when the force components of the unbalanced mass act only in the direction of the piston stroke and is then at a minimum when the force components mutually compensate for each other and, in particular, when the force components act only in the direction orthogonal to the piston stroke and completely cancel each other out.

In this respect it can be preferred when the balancer shafts are provided with intermeshing shaft spur gears for reversing the direction of rotation and the transmission driving the balancer shafts is constructed as a spur gear transmission with two spur gears with rolling circles that differ from a circular shape and have sections that alternately project outward and recede inward. These sections each have profiles that are spaced apart in pairs and symmetrical relative to the rotational axes of the spur gears. Differently than in the prior art cited above, the spur gears thus do not rotate about eccentric axes, but instead about their axes of symmetry, wherein the projecting and recessed sections must be shaped and positioned relative to each other such that the spur gears always intermesh.

As an alternative transmission, a traction mechanism drive could also be provided with a toothed belt or a chain as the traction mechanism that is disclosed with respect to the layout (spatial arrangement of the crankshaft and balancer shafts), for example, in DE 10 2004 033 927 A1 cited above. In this case, the driving wheel on the side of the crankshaft and/or the driving wheels on the side of the balancer shafts must have a non-round construction that produces the intentional non-uniformity in the transmission.

Advantageously, the rolling circle of the spur gear running on the side of the balancer shafts should have exactly two projecting sections and two recessed sections and the rolling circle of the spur gear running on the side of the crankshaft should have exactly four projecting sections and four recessed sections. The angular speed of the balancer shafts is then at a maximum when a projecting section of the crankshaft-side spur gear and a recessed section of the balancer shaft-side spur gear are engaged. Accordingly, the angular speed of the balancer shafts is then at a minimum when a recessed section of the crankshaft-side spur gear and a projecting section of the balancer shaft-side spur gear are engaged.

For the dimensioning of the unbalanced masses with respect to the non-uniform angular speed of the balancer shafts, the following relationship should also apply:

$$i. \quad \frac{m \cdot r}{m' \cdot r'} = \frac{\omega^2}{\omega_{max}^2}$$

Where:
  $m \cdot r$ = the unbalanced masses of the balancer shafts
  $\omega$ = average angular speed of the balancer shafts
  $\omega_{max}$ = maximum angular speed of the balancer shafts
  $m' \cdot r'$ = unbalanced masses of balancer shafts that rotate at the average angular speed and would generate, at the piston dead centers, the same force components as the balancer shafts rotating at the maximum angular speed.

The ratio of maximum to average angular speed of the balancer shafts is advantageously a maximum 1.3, because the excitation of torsional vibrations of higher orders would become too large at a ratio greater than 1.3. The ratio advantageously lies in a range between 1.1 and 1.2. At a ratio of 1.2, the value of the quotient (m·r)/(m'·r') is approximately 0.7. This means that the unbalanced mass and, for an unchanged unbalanced mass radius, the unbalanced mass of each balancer shaft, can be reduced by approximately 30%. The basis for this result is a mass-balancing device with uniformly rotating balancer shafts.

In one alternative construction, however, it could also be provided that at the maximum angular speed of the balancer shafts, the free inertial forces of the internal combustion engine are over-compensated, in order to minimize the average deviation from the ideal compensation of the inertial forces of second and higher orders.

BRIEF DESCRIPTION OF THE DRAWING

Additional features of the invention are found in the following description and in the drawings. Shown are:

FIG. 1 the transmission schematic of one embodiment of a mass-balancing device according to the invention, FIG. 2 a diagram that shows the angular speed of the balancer shafts and the associated forces over the crankshaft angle, and FIG. 3 the transmission schematic of a known mass-balancing device.

DETAILED DESCRIPTION OF THE PREFERRED EMBODIMENT

The embodiment of the invention disclosed in FIG. 1 is explained starting with FIG. 3 in which a preferred application of the invention is shown with reference to a transmission schematic. This involves the known mass balancing of a reciprocating piston internal combustion engine 1 in a 4-cylinder in-line construction that has, for balancing the free inertial forces of second order, two balancer shafts 3' and 4' rotating in opposite directions at twice the rotational speed of the crankshaft 2. The balancer shafts 3', 4' are driven by means of a transmission 5' in the form of a spur gear transmission with spur gears 6' and 7'. This spur gear transmission is arranged between the crankshaft 2 and the balancer shafts 3', 4' and transmits the rotation of the crankshaft 2 at the transmission ratio 1:2 uniformly to the balancer shafts 3', 4' that consequently rotate at twice the crankshaft rotational speed.

The force components of the unbalanced masses designated with m'·r' in the balancer shafts 3', 4' cancel each other out in the direction orthogonal to the piston stroke and boost each other, i.e., double, in the direction of the piston stroke. The crankshaft angle α=45° after the top dead center is shown, i.e., the crankshaft 2 is located in a 45° position after the piston top dead center of cylinders no. 1 and no. 4. In this position, the unbalanced masses m'·r' directed away from each other and in the direction perpendicular to the piston stroke cancel each other out completely. At a crankshaft angle α=0°, i.e., the pistons 8 of the cylinders no. 1 and no. 4 are located exactly in the top dead center, both unbalanced masses m'·r' are directed downward in the piston stroke direction, so that their total force effect is doubled. This also applies to the crankshaft angle α=180° after the top dead center at which the pistons 8 of the cylinders no. 1 and no. 4 are located in the piston bottom dead center. A doubled force effect directed upward occurs analogously at the crankshaft angles α=90° and α=270°. These force profiles are given in the diagram according to FIG. 2 in which the dashed line F' shows the force effect of the balancer shafts 3', 4' rotating at the constant angular speed ω.

In the mass-balancing device according to the invention in FIG. 1, the balancer shafts 3, 4 are also provided with intermeshing shaft spur gears 9 and 10 for reversing the direction of rotation. Likewise, a transmission 5 driving the balancer shafts 3, 4 is provided in the form of a spur gear transmission that has spur gears 6 and 7 with rolling circles that deviate from a circular shape, in order to drive the balancer shafts 3, 4 with a transmission ratio that is non-uniform over the crankshaft angle α, with this ratio being the crankshaft rotational speed relative to the balancer shaft rotational speed. For this purpose, the rolling circles of the spur gears 6, 7 have sections that alternately project and recede relative to the circular shape and run at a distance in pairs symmetrical to the rotational axes 11 and 12 of the spur gears 6 and 7, respectively. The rolling circle of the spur gear 6 running on the side of the balancer shafts 3, 4 has exactly two projecting sections 13 and two recessed sections 14, while the spur gear 7 running on the side of the crankshaft 2 (see FIG. 3) has exactly four projecting sections 15 and four recessed sections 16.

While the average of the transmission ratio of the transmission 5 is 1:2, i.e., the average rotational speed of the balancer shafts 3, 4 is twice as high as that of the crankshaft 2, as in the known mass-balancing device according to FIG. 3, the shape of the rolling circles of the spur gears 6 and 7 is such that the maximum angular speed $\omega_{max}$ of the balancer shafts 3, 4 is approximately 20% greater and the minimum angular speed $\omega_{min}$ of the balancer shafts 3, 4 is approximately 20% less than their average angular speed ω. The angular speed is then at a maximum when the force effect of the unbalanced masses designated with m·r is doubled. As can be seen from FIG. 2 on the force effect F, this occurs at the four crankshaft angles α=0° (top dead center of the cylinders no. 1 and no. 4; bottom dead center of the cylinders no. 2 and no. 3), α=90°, α=180° (bottom dead center of the cylinders no. 1 and no. 4; top dead center of the cylinders no. 2 and no. 3), and α=270°. Accordingly, the angular speed is then at a minimum when the force effect of the unbalanced masses m·r is completely canceled out. This occurs at the four crankshaft angles in-between, α=45°, α=135°, α=225°, and α=315°.

The ratio of the maximum angular speed $\omega_{max}$ to the average angular speed ω has the effect that the unbalanced masses m·r of the balancer shafts 3, 4 have relatively small dimensions and nevertheless the free inertial forces of second order can be completely compensated for, when these are at a maximum. The basis of comparison is the mass-balancing device according to FIG. 3 that has balancer shafts 3', 4' with the unbalanced masses m'·r' rotating uniformly at the average angular speed ω. Then, for the same force effect, the following relationship holds true:

$$F = m \cdot r \cdot \omega_{max}^2 = F' = m' \cdot r' \cdot \omega^2$$

and thus:

$$\frac{m \cdot r}{m' \cdot r'} = \frac{\omega^2}{\omega_{max}^2}$$

If $\omega_{max}/\omega = 1.2$, then the ratio (m·r) (m'·r') is approximately 0.7. In other words, the unbalanced mass m·r of the non-uniformly rotating balancer shafts 3, 4 can have approximately 30% smaller dimensions. If the unbalanced mass radius r remains unchanged, then this applies directly for the unbalanced mass m.

LIST OF REFERENCE SYMBOLS

1 Internal combustion engine
2 Crankshaft
3 Balancer shaft
4 Balancer shaft
5 Transmission
6 Spur gear
7 Spur gear
8 Piston
9 Shaft spur gear
10 Shaft spur gear
11 Rotational axis
12 Rotational axis
13 Projecting region
14 Recessed region
15 Projecting region
16 Recessed region

The invention claimed is:

1. A mass-balancing device for balancing free inertial forces or free moments of inertia of a reciprocating piston internal combustion engine, comprising two balancer shafts that rotate in opposite directions at a same rotational speed with unbalanced masses that have force components that boost each other in a direction of a piston stroke and that cancel each other out in a direction orthogonal to the piston stroke, and a transmission arranged between a crankshaft of the internal combustion engine and the balancer shafts drives the balancer shafts at a transmission ratio that is non-uniform over a crankshaft angle, with the transmission ratio being the ratio of a crankshaft rotational speed to a balancer shaft rotational speed, such that an angular speed of the balancer shafts is at a maximum at piston dead centers, the mass-balancing device is configured for an internal combustion engine only in a multi-cylinder construction and an average of the transmission ratio is 1:2.

2. The mass-balancing device according to claim 1, wherein the balancer shafts are provided with intermeshing shaft spur gears for reversing a direction of rotation and the transmission driving the balancer shafts is constructed as a spur gear transmission with two spur gears that have rolling circles that differ from a circular shape and have alternating projecting sections and recessed sections with respect to the circular shape and the projecting and recessed sections run in pairs spaced apart symmetric to rotational axes of the spur gears.

3. The mass-balancing device according to claim 2, wherein the rolling circle of the spur gear running on a side of the balancer shafts has exactly two projecting sections and two recessed sections and the rolling circle of the spur gear running on a side of the crankshaft has exactly four projecting sections and four recessed sections.

4. The mass-balancing device according to claim 1, wherein $$\frac{m \cdot r}{m' \cdot r'} = \frac{\omega^2}{\omega_{max}^2}$$

with the designations:
m·r=the unbalanced masses of the balancer shafts
$\omega$=average angular speed of the balancer shafts
$\omega_{max}$=maximum angular speed of the balancer shafts
m'·r'=unbalanced masses of balancer shafts that rotate at the average angular speed and at the piston dead centers, the same force components were generated as the balancer shafts rotating at the maximum angular speed.

5. The mass-balancing device according to claim 4, wherein $\omega_{max}/\omega \leq 1.3$.

6. The mass-balancing device according to claim 5, wherein $1.1 \leq \omega_{max}/\omega \leq 1.2$.

* * * * *